United States Patent
Bittner et al.

(10) Patent No.: US 7,441,239 B2
(45) Date of Patent: Oct. 21, 2008

(54) COMPUTER PROGRAM PRODUCT METHOD AND COMPUTER IN ROLE-BASED APPLICATION SYSTEMS

(75) Inventors: Peter Bittner, Hockenheim (DE); Bernhard Drittler, Walldorf (DE); Jürgen Heymann, Leimen (DE); Stefan Kusterer, Malsch (AT); Sven Schwerin-Wenzel, Dielheim (DE); Thorsten Vieth, Wiesloch (DE)

(73) Assignee: SAP AG, Walldorf (DE)

( * ) Notice: Subject to any disclaimer, the term of this patent is extended or adjusted under 35 U.S.C. 154(b) by 877 days.

(21) Appl. No.: 10/472,249

(22) PCT Filed: Mar. 18, 2002

(86) PCT No.: PCT/EP02/02965

§ 371 (c)(1),
(2), (4) Date: May 5, 2004

(87) PCT Pub. No.: WO02/075529

PCT Pub. Date: Sep. 26, 2002

(65) Prior Publication Data
US 2004/0187114 A1    Sep. 23, 2004

(30) Foreign Application Priority Data
Mar. 20, 2001    (EP) ................ 011068988

(51) Int. Cl.
G06F 9/46    (2006.01)
G06F 9/44    (2006.01)
G06F 9/00    (2006.01)
(52) U.S. Cl. .............. 718/100; 717/100; 712/220
(58) Field of Classification Search ............ 718/100; 717/100; 712/220
See application file for complete search history.

(56) References Cited

U.S. PATENT DOCUMENTS 5,727,155 A * 3/1998 Dawson ................ 709/205

(Continued)

FOREIGN PATENT DOCUMENTS

JP          10-011506          1/1998

(Continued)

OTHER PUBLICATIONS

Author: Kami Brooks; Title: Migrating to role-based access control; Date: Oct. 28-29, 1999; Publisher: ACM New York, NY, USA.*

(Continued)

*Primary Examiner*—Meng-Ai An
*Assistant Examiner*—Camquy Truong
(74) *Attorney, Agent, or Firm*—Mintz, Levin, Cohn, Ferris, Glovsky & Popeo, P.C.

(57) ABSTRACT

A role-based computer system has a first processor with a computer program (100) and has further processors with application systems (Sy1, Sy2, Sy3) and application services (Se). The program generates a start instruction for the further processors to execute the services by consecutively receiving a log-in identification from the user and looking up in a first assignment table (101) for a role (Ro), looking up in a second assignment table (102) to determine logical services (LSe) assigned to the role; and looking up in a second assignment table to determine a pointer (P(Sy/Se)) to the services (Se) that are assigned to the logical service. The pointer has first and second portions to identify the application system (Sy) and the application service (Se), respectively, and becomes part of the start instruction (350).

15 Claims, 3 Drawing Sheets

U.S. PATENT DOCUMENTS

| | | | | |
|---|---|---|---|---|
| 6,073,119 | A | * | 6/2000 | Bornemisza-Wahr et al. . 705/42 |
| 2002/0188497 | A1 | * | 12/2002 | Cerwin ........................ 705/10 |
| 2004/0088197 | A1 | * | 5/2004 | Childress et al. ............... 705/4 |
| 2004/0093525 | A1 | * | 5/2004 | Lamen ....................... 713/201 |
| 2005/0120012 | A1 | * | 6/2005 | Poth et al. ...................... 707/3 |

FOREIGN PATENT DOCUMENTS

JP            10-162061           6/1998

OTHER PUBLICATIONS

David Ferraiolo, et al., "Specifying and Managing Role-Based Access Control Within a Corporate Intranet," Proceedings of the Second ACM Workshop on Role-Based Access Control, Nov. 6-7, 1997, pp. 77-82.

D. McNutt "Role-Based System Administrator or Who, What, Where, and How," Proceedings of the Systems Administration Conference, Lisa, Nov. 1, 1993, pp. 107-112.

D. Thomsen, et al., "Role based Access Control Framework for Network Enterprises," Proceedings 14th Annual Computer Security Applications Conference, Phoenix, Arizona, Dec. 7-11, 1998, pp. 50-58.

Satheesh A. Donthy, "Coordinator: A Java based Manufacturing Application," Case Study, Jan. 10, 2000, http://www.members.tripod.com/sdonthy/case-study/casestudy.html, retrieved Aug. 30, 2001.

Sybase, Inc., "Enterprise Portal—Overview and User Guide," Sybase Enterprise Portal Version 1.0 Documentation, May 2000, pp. 1-96. Document from the Internet: http://www.download.sybase.com/pdfdocs/epg0100e/ep_intro.pdf retrieved Aug. 30, 2001.

Yamazaki, et al., "Designing of RBAC Component for Security of Smart-office Environment", *Computer Security Symposium 2000*, vol. 2000, No. 12, pp. 319-324, Information Processing Society of Japan, Oct. 26, 2000 (CSDB: National Academic Paper 200200121048), Japanese document, English translation abstract.

Enoki, et al., "A Study of Access Control for Sharing Enterprise Information", *Technical Report of IEICE*, vol. 97, No. 493, pp. 13-18, OFS97-56, The Institute of Electronics, Information and Communication Engineers, Jan. 23, 1998 (CSDB: National Academic Ppaer 200202374003), Japanese document, English translation abstract.

Sekine, et al., "On Applying MSI Architecture to Tele-education Services", *NTT R&D*, vol. 47, No. 3, pp. 311-318, The Telecommunications Association, Mar. 10, 1998 (CSDB: Enterprise Technical Report 199800076007) Japanese document; English translation abstract.

\* cited by examiner

COMPUTER PROGRAM PRODUCT METHOD AND COMPUTER IN ROLE-BASED APPLICATION SYSTEMS

FIELD OF THE INVENTION

The present invention generally relates to data processing and, more particularly, relates to role-based computer systems, computer programs, and methods that launch computer application services.

BACKGROUND OF THE INVENTION

Computer systems are of vital importance in almost all organizations or enterprises, such as business organizations, governmental organizations, nonprofit organizations, etc.

Often, the computer system comprises a network of interconnected computers. A user logs on to a first computer but actually uses application services that are provided by further computers. Groups of users with similar responsibilities (within the organization) share application services, whereas other groups of users with other predefined responsibilities require other application services. To comply with these requirements, the system offers predefined combinations of application services in so-called roles. Multiple users access the same system in different, user dependent roles. It is also possible that the same-user uses different roles at different times. In other words, roles link people and application processes in a predefined relationship.

Usually, the applications services belonging to the role appear to the user in the human interface as graphical symbols like icons on the screen (e.g., graphical user interface). It is an advantage that roles limit the number of displayed services from all available services, roles thereby hide the complexity of the overall system-landscape from the user. For example, the typical number of usually available different roles can be up to 1000, while a single user can have up to 5 roles.

The scenario in a typical role-based system usually involves the following steps:
(a) the user logs on to the system by the first computer;
(b) a program in the first computer determines the role of the user;
(c) the computer identifies the application services by looking up in a service-to-role assignment table; and
(d) with or without user interaction, the first computer sends service start signals to the further computers that are identified in the table.

Besides the large size of the assignment table, the above scenario is further challenged by changes on both ends, such as: (i) application services in the further processors are regularly updated, added or removed; and (ii) role definitions for single users also change from time to time. It is a serious technical problem that in both cases (i) and (ii), the service-to-role assignment tables for all users have to be updated as well.

Different assignment tables have to be stored for different installations of the system, and thus the amount of assignment data to be maintained becomes huge.

Hence, the present invention seeks to provide method, computer program product and apparatus for an improved role management.

SUMMARY OF THE INVENTION

The present invention relates to a computer program product (CPP) with program instructions for a first processor, the first processor is coupled to further processors that run application systems with a plurality of application services, the computer program-product causes the first processor (a) to determine a first role that is assigned to a user upon receiving a log-on identification, and (b) to generate a start instruction for the further processors for executing at least one application service.

The CPP is characterized by causing the first processor to execute the following steps: determining logical services that are assigned to the first role; determining at least one pointer to the application services that is assigned to the logical services, the pointer having a first portion with an identification of the application system and a second portion with an identification of the application service; and providing a copy of the pointer as the start instruction.

The use of logical services between role and application services according to the present invention mitigates the technical problems that are associates with (i) updating, adding or removing application services and (ii) changing the role definitions.

The CPP causes the first processor to generate a start instruction with a unique resource locator. This feature allows to use standard protocols.

The CPP causes the first processor to display a graphical representation of the application services that are pointed to by the pointers. This feature addresses the user who is given the choice to select an application service by a pointer selection.

Upon receiving the log-on identification, multiple roles are determined that are assigned to the user, further logical services are determined, and further pointers are determined.

The CPP causes the first processor to display a feedback from the application services. This feature allows the user to be informed about particularities of the services, before or during execution of these services.

The steps determining a first role, determining logical services, and determining at least one pointer are executed by looking up in a first predefined assignment table, in a second predefined assignment table, and in a third predefined assignment table, respectively.

The computer program is embodied in a record medium or is stored in a computer memory (e.g., read-only).

The present invention relates to an electrical signal that carries computer program code, the code with a start instruction for a first processor that provides an application system and executes at least one application service, the start instruction is characterized by being provided by a second processor that has performed the following prior steps: determining a first role that is assigned to a user upon receiving a log-on identification; determining logical services that are assigned to the first role; determining a pointer to the application services that is assigned to a logical service, the pointer having at least a first portion with an identification of the application system and a second portion with an identification of the application service; and providing a copy of the pointer as the start instruction.

The present invention relates to a control computer to control the execution of application services on application systems that are implemented by further computers coupled to the control computer. The control computer determines a first role that is assigned to a user upon receiving a log-on identification, and generates a start instruction for the further computers for executing at least one application service. The control computer is characterized by executing the following: determining logical services that are assigned to the first role; determining at least one pointer to the application services that is assigned to a logical service, the pointer having a first portion with an identification of the application system and a second portion with an identification of the application service; and providing a copy of the pointer as the start instruction.

The present invention relates to a method to trigger the execution of application services in a plurality of application systems that are implemented by a plurality of application processors coupled to a control processor, the method comprises the following steps: determining a first role that is assigned to a user upon receiving a log-on identification; determining logical services that are assigned to the first role; determining at least one pointer to the application services that is assigned to a logical service, the pointer having a first portion with an identification of the application system and a second portion with an identification of the application service; and generating a start instruction for the application processors with a copy of the pointer for executing at least one application service.

The step generating the start instruction comprises to generate a start instruction with a unique resource locator.

The step determining pointers comprises to display a graphical representation of the application services that are pointed to by the pointers.

The step determining pointers comprises to receive a pointer selection from the user.

Multiple roles are determined that are assigned to the user, further logical services are determined, and further pointers are determined.

In the steps determining a first role, determining logical services, and determining at least one pointer are executed by looking up in a first predefined assignment table, in a second predefined assignment table, and in a third predefined assignment table, respectively.

The steps are performed by a control processor that is separate to the application processors.

Invention relates to a method for launching a subset of application services out of a plurality of application services by a first computer system, the plurality of application services hosted by a plurality of further computer systems. The method is performed by the first computer system and comprises the following steps: receiving a log-on identification from a user; determining a first role of the user based on the log-on identification, (the first role is a representation of the subset of application services); identifying a subset of logical services for the role out of a plurality of logical services; finding a subset of application service pointers out of a plurality of application service pointers, (the application service pointers of the subset are assigned to the logical services of the subset of logical services); and launching the subset of application services identified by the subset of application service pointers. As in claim 21, preferably, the computer program comprises program instructions for causing a computer to perform the method steps.

SHORT DESCRIPTIONS OF TABLES

In the detailed description section, tables 1-3 illustrate examples of assignments that are used by the computer program product: table 1 indicates a role to user assignment (abbreviated as "Ro-U"); table 2 indicates a logical service to role assignment ("LSe-Ro"), table 3 indicates an application service pointer to logical service assignment ("P-LSe"). Tables 1-3 in the text correspond to tables 101-103 in FIG. 2.

DETAILED DESCRIPTION OF THE INVENTION

For convenience, the description and drawings sometimes use acronyms such as "Ro" for role, "U" for user, "LSe" for "logical service", "Se" for "service", and "Sy" for "system".

The present invention provides a technical solution to the mentioned problems by providing a service to role assignment that is indirect; 3 separate assignments are introduced that use logical services in an intermediate function. The assignments are, preferably, stored in tables. Modifications are made easier: when introducing a new role design, the first assignment remains unchanged; similarly, when modifying application services (e.g., by updating, adding or removing services), the last assignment remains unchanged.

Figure 1:
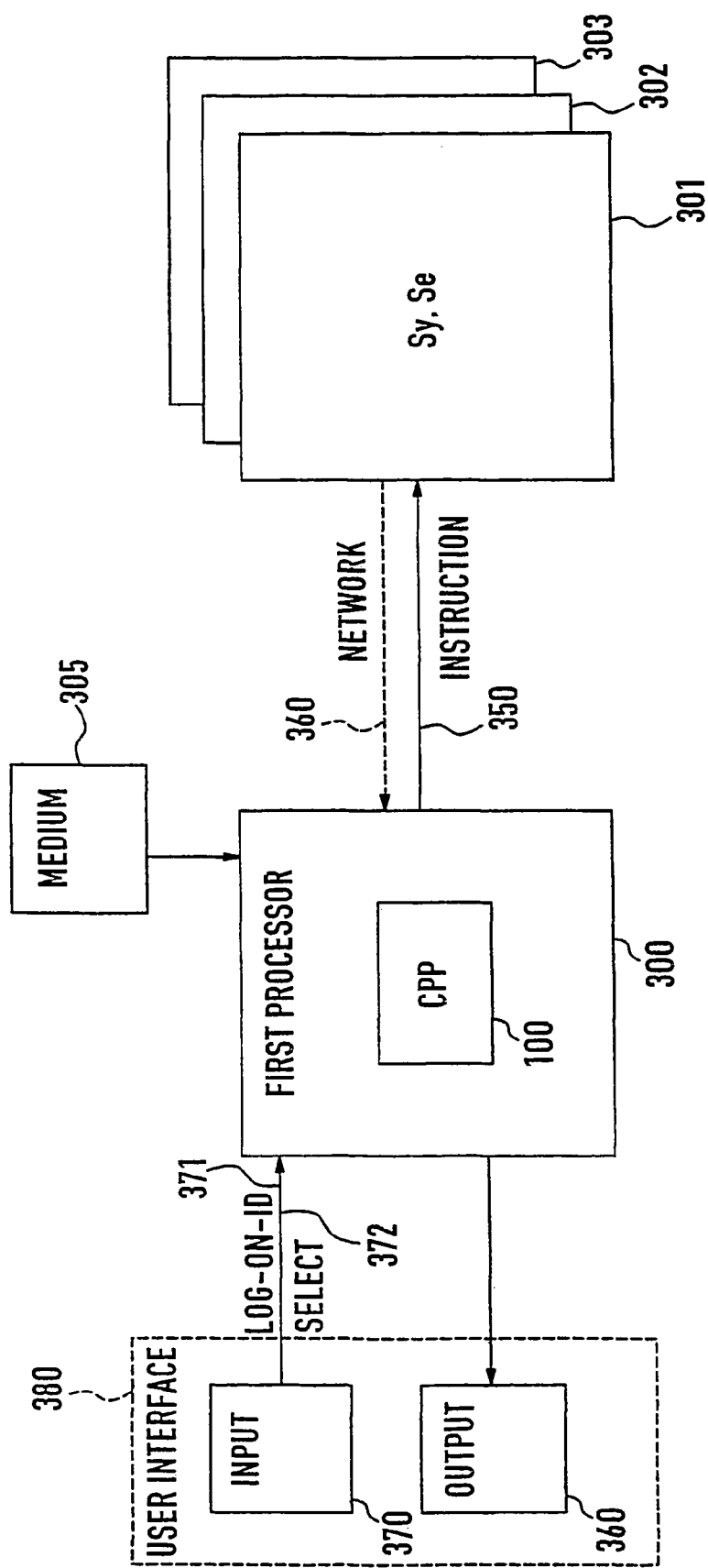
FIG. 1 is a simplified block diagram of a distributed computer system with a first processor, further processors, an inter-processor network, and a user interface with input-output devices.

FIG. 1 is a simplified block diagram of distributed computer system 300-303 with first processor 300, further processors 301-303, inter-processor network 360, as well as user interface 380 (dashed frame) with input device 370 and output device 380.

Processor 300 is coupled to processors 301-303 via network 360. Network 360 can be, for example, local area network (LAN) or a wide area network (WAN). Network 360 can operate according to any suitable transmission protocol, such as the transmission control protocol/internet protocol (TCP/IP).

For convenience, processor-300 is sometimes referred to as "control computer" or "control processor" and processors 301-303 are sometimes referred to as "application computer" or "application processor".

Computer program product 100 (CPP) is illustrated as already being loaded into processor 300; CPP 100 can also be embodied in medium 305. Input device 370 sends user log-on identification 371 (ID) to processor 300/CPP 100. According to the present invention, CPP 100 evaluates ID 371 and conveys start instruction 350 to processors 301-303 that on their turn run application systems (Sy) with a plurality of application services (Se). Details will be explained in connection with the following figures (FIG. 2: tables, Sy,Se).

Device 370 is implemented, for example, by elements such as keyboard, touch screen, mouse, finger-print reader, modem, or radio data receiver. Device 360 is implemented, for example, by elements such as display (CRT, TFT), printer, plotter, or loudspeaker.

Arrows indicate a preferred data signal flow. The number of processors and network connections in FIG. 1 is intended to be a non-limiting example; persons of skill in the art can enlarge or reduce the system without departing from the scope of the present invention.

Figure 2:
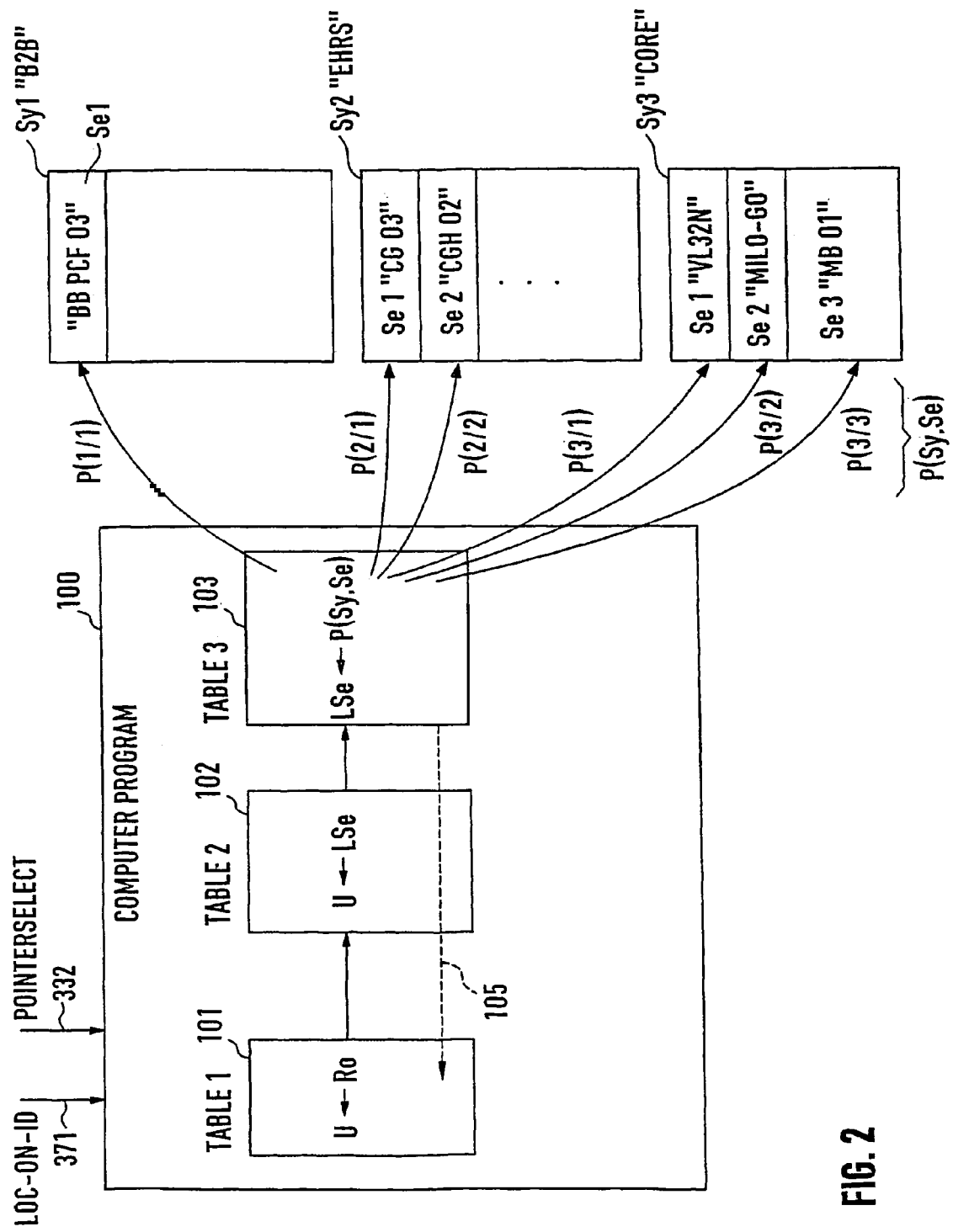
FIG. 2 is a simplified block diagram of a computer program product executed by the first processor and applications executed by the further processors.

FIG. 2 is a simplified block diagram of computer program product 100 executed by processor 300 and applications Sy/Se executed by processors 301-303. As illustrated, processors 301, 302, and 303 implement system Sy1, Sy2, and Sy3, respectively; each system implements a plurality of application services Se. The arrows from CPP 100 to the services symbolize pointers P(Sy/Se).

Computer program product 100 has program instructions for processor 300 that cause processor (a) to determine (cf. 205, FIG. 3) a first role that is assigned to the user upon receiving log-on ID 371, and (b) to generate start instruction 350 for processors 301-303 for executing at least one application service (Se).

According to the present invention, CPP 100 is characterized by causing processor 300 to execute the following steps: determining (210) logical services (LSe) that are assigned to a first role; and determining (220) at least one pointer (P(Sy/Se)) to the application services (Se) that is assigned to the logical service; and providing a copy (230) of the pointer as the start instruction. The pointer has at least a first portion with an identification of the application system (Sy) and a second portion with an identification of the application service (Se). To enhance functionality, persons of skill in the art can add further pointer portions without departing from the present invention.

Preferably, the steps determining (205) a first role, determining (210) logical services, as well as determining (220) the pointer are executed by looking up in predefined assignment tables, these are table 101 (role-to-user-assignment), table 102 (logical-service-to-role-assignment), and table 103 (pointer-to-logical-service-assignment) respectively. Examples are given in tables 1-3, explained below.

Preferably, CPP 100 causes processor 300 to generate start instruction 350 (cf. FIG. 1) with a unique resource locator (URL) or a unique resource identifier (URI). Preferably, CPP 100 causes processor 300 to display on output device 360 (cf. step 240) a graphical representation (cf. FIG. 4) of the application services that are pointed to by the pointers P(Sy/Se). Optionally, CPP 100 causes processor 300 to receive pointer selection 372 from the user (details in FIG. 3). Optionally, wherein upon receiving (205) the log-on identification, multiple roles are determined that are assigned to the user, further logical services (LSe) are determined, and further pointers are determined. Feedback from the application services Se on processors 301-303 can optionally displayed via processor 300 on output device 360.

Figure 3:
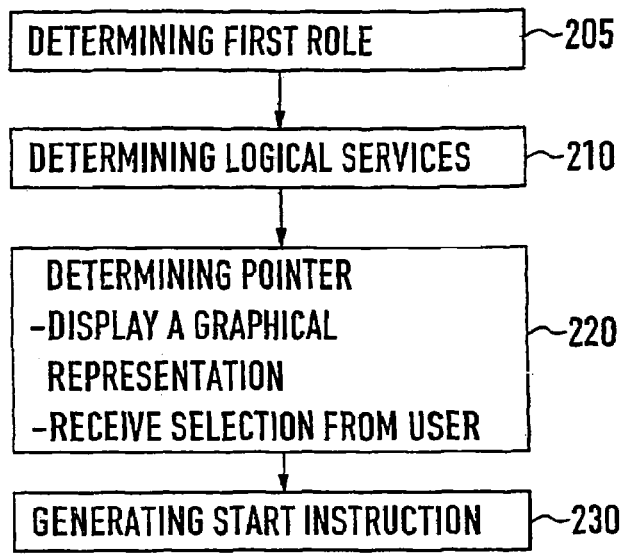
FIG. 3 is a simplified flow chart diagram of a method of the present invention.

FIG. 3 is a simplified flow chart diagram of method 200 of the present invention. Method 200 is, preferably, performed by control processor 300 that is—as explained above—separate from application processors 301-303. Separate means that processors are physically independent.

Method, 200 to trigger the execution of application services Se in a plurality of application systems Sy (implemented by plurality of application processors 301-303, coupled to control processor 300) comprises the following steps:

determining 205 a first role that is assigned to a user upon receiving log-on ID 371;

determining 210 logical services (LSe) that are assigned to the first role;

determining 220 at least one pointer (P(Sy/Se)) to the application services (Se) that is assigned to the logical service; and generating 230 start instruction 350 for application processors 301-303 with a copy of the pointer for executing at least one application service (Se).

As mentioned, the pointer has at least a first portion with an identification of the application system (Sy) and a second portion with an identification of the application service (Se).

Details of the present invention are explained in the following. Preferably, generating 230 comprises to generate a start instruction with a unique resource locator (URL). Optionally, determining 220 pointer comprises to display a graphical representation of the application services that are pointed to by the pointers (e.g., displayed at output device 360, cf. FIG. 4). Also optionally, determining 220 pointers comprises to receive a pointer selection 372 from the user (e.g., via input device 370).

Throughout the method steps, multiple roles can be determined that are assigned to a single user, further logical services (LSe) are determined, and further pointers are determined.

Referring back to FIG. 2, steps determining 205 a first role, determining 210 logical services (LSe), and determining 220 pointer are, preferably, executed by looking up in tables 101, 102, 103, respectively (predefined assignment tables). This is convenient, but not essential, the assignment can also be determined from directory structures.

The present invention is now explained by example. Language in quotation marks (such as "goods receipt specialist") merely indicates the exemplary character of this explanation. For convenience of further explanation, assignments are described in tables 1-3 with a key in the left column and the object assigned to the key in the right column ("object-to-key" assignment).

Tables 1-3 illustrate examples of assignments that are used by the present invention, such as by computer program product 100 and method 200: table 1 indicates a role to user assignment (RoU, table 101 in FIG. 2); table 2 indicates a logical service to role assignment (LSeRo, table 102), table 3 indicates an application service pointer to logical service assignment (PLSe, table 103).

TABLE 1

| User U | role Ro | role-to-user assignment |
|---|---|---|
| U 1 | Ro 1 | "goods receipt specialist" |
| U 1 | Ro 2 | "employee" |
| U 2 | Ro 2 | "employee" |
| U 2 | Ro 3 | "manager" |
| U 2 | Ro 4 | "warehouse manager" |

As in table 1 (table 101 in FIG. 2), first user 1 is assigned to roles 1 and 2, and second user 2 is assigned to roles 2, 3 and 4. Role-overlapping is possible, for example, both users 1 and 2 are "employees". Users 1 and 2 have roles that are excluded: role 1 and roles 3/4.

TABLE 2

| role Ro | logical service LSe |
|---|---|
| | logical-service-to-role assignment |
| Ro 1 | LSe 1 |
| | LSe 2 |
| | LSe 3 |
| | LSe 4 |
| Ro 2 | LSe 5 |
| | LSe 6 |
| | LSe 7 |
| | . . . |
| Ro 3 | LSe 8 |
| | . . . |

As in table 2, logical-services are assigned to roles. In step 210, it is determined that, logical services LSe 1, LSe 2, LSe 3 and LSe 4 are assigned to role 1.

TABLE 3 application service pointer to logical service assignment

| logical services LSe | | pointers P(Sy/Se) | |
|---|---|---|---|
| LSe 1 | "CONFIRM GOODS RECEIPT" | P (1/1) Sy = "B2B" | Se = "BBPCF03" |
| Lse 2 | "DISPLAY SUBSTANCE" | P (2/1) Sy = "EH&S" | Se = "CG03" |
| Lse 3 | "EDIT WORK AREA" | P (2/2) Sy = "EH&S" | Se = "CBIH02" |
| Lse 4 | "POST GOODS RECEIPT" | P (3/1) Sy = "ISA" | Se = "BORGR_B" |
| Lse 4 | "POST GOODS RECEIPT" | P (3/2) Sy = "CORE" | Se = "MIGO_GO" |
| LSe 4 | "POST GOODS RECEIPT" | P (3/3) Sy = "CORE" | Se = "MB01" |

As in table 3, pointers P(Sy/Se) are assigned to application services (Se). The pointers have a first portion with an identification of the application system (Sy) and a second portion with an identification of the application service (Se).

When receiving start instruction 350 (cf. FIG. 1), the application system (Sy) executes the application service (Se).

In other words, the logical services (LSe) are descriptions of the role activities, and the pointers point to the physical implementations of these activities (i.e. application services) that are implemented as executable program code.

Some services are assigned to one and the same logical service, such as services "BORGR_B", "MILO_GO" and Se="MB01" are assigned to LSe 4. Other services are assigned to a single LSe only (cf., Se in the first 3 rows). In the examples, the pointers are implemented by transaction codes (in the quotation marks) that are placeholders for URL-addresses. In step determining 220 at least one pointer, at least one pointer is selected automatically according to predefined criteria (e.g. availability of services). Optionally, determining is performed with user interaction as illustrated in connection with FIG. 4.

Figure 4:
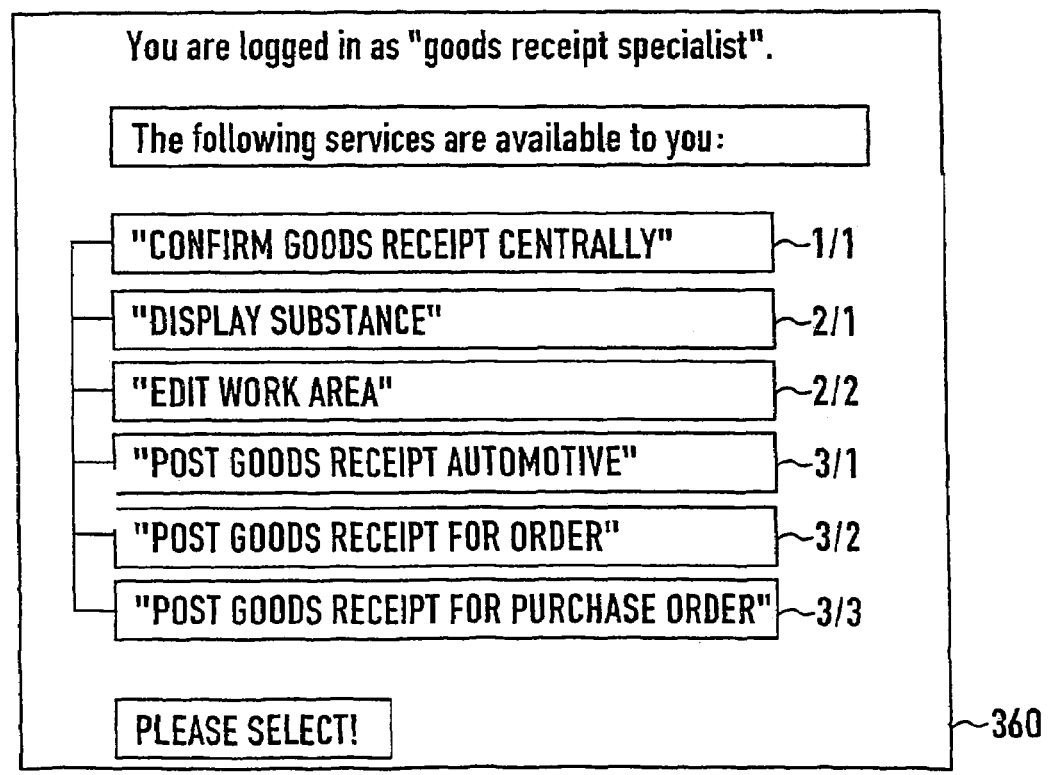
FIG. 4 is a simplified diagram of a computer display with graphical representations that are optionally presented to the user.

FIG. 4 is a simplified diagram of computer display 360 with graphical representations that are optionally presented to the user (cf. step 240). The representations stand for application services (Se). In the example of FIG. 4, processor 300 uses a web browser for displaying the representations as text strings in a tree. Processor 300 displays a greeting informing the user about his or her role: "You are logged on as Goods Receipt Specialist" and displays representations of application services pointed to by pointers P(1/1), P(2/1), P(2/2), P(3/1), P(3/2) and P(3/3). The representations are:
"CONFIRM GOODS RECEIPT CENTRALLY" for P(1/1),
"DISPLAY SUBSTANCE" for P(2/1),
"EDIT WORK AREA" for P(2/2),
"POST GOODS RECEIPT AUTOMOTIVE" for P(3/1),
"POST GOODS RECEIPT FOR ORDER" for P(3/2), and
"POST GOODS RECEIPT FOR PURCHASE ORDER" for P(3/3).

The reference numbers in FIG. 4 conveniently follow the Sy/Se indices as in FIG. 2. The services in system 3 are similar in the sense that they all are related to the logical function "POST GOOD RECEIPT". Now, CPP 100 causes processor 300 to receive a pointer selection 372 (cf. FIG. 1) from the user (cf. invitation "Please select!" in FIG. 4).

Having illustrated representations of applications is convenient for explanation; an application service itself can be visualized as well. For example, and without the intention to be limiting, the application service can comprise alerts, reports, access to e-mail or calendar, search engines, company or web news, stock tickers, travel expense entry, and text processing tool.

In a further example, the definition of a role comprises the logical service LSe of sending an email. Various email services are available on different platforms, in other words, multiple services Se are available. Instead of displaying different representations, as (i) for a stationary personal computer (i.e., processor 301), (ii) for a mobile phone with short message service (SMS) capacity (i.e., processor 302), or for a handheld portable computer (i.e., processor 303), processor 100 does not ask the user for any selection. Instead, processor 100 looks up for a context attribute and automatically selects the appropriate service.

The present invention can also be described as a method for launching a subset of application services out of a plurality of application services by a first computer system, the plurality of application services hosted by a plurality of further computer systems, the method being performed by the first computer system and comprising the following steps:
receiving a log-on identification from a user;
determining a first role of the user based on the log-on identification, wherein the first role is a representation of the subset of application services;
identifying a subset of logical services for the role out of a plurality of logical services;
finding a subset of application service pointers out of a plurality of application service pointers, wherein the application service pointers of the subset are assigned to the logical services of the subset of logical services; and
launching the subset of application services identified by the subset of application service pointers.

The present invention can also be described as an electrical signal (e.g., between medium 305 or input device 370) that carries computer program code (i.e., program 100), the code including start instruction 350 for a first processor (e.g., any of processors 301-303), wherein the first processor provides an application system (Sy) and executes at least one-application service (Se). The start instruction is characterized by being provided by second processor 300 that has performed the following: determined 205 a first role that was assigned to a user upon receiving a log-on identification 371; determined 210 logical services (LSe) assigned to the first role; determined 220 a pointer to the application services (Se) assigned to the logical service, the pointer having a first portion with an identification of the application system (Sy) and a second portion with an identification of the application service (Se); and provided a copy 230 of the pointer as the start instruction.

While in the prior art, a direct assignment had to be made from pointers to roles (cf. dashed arrow 105 in FIG. 2), the present invention uses an indirect assignment (cf. tables 101, 102 and 103). In the prior art, the roles had to be tailored to specific combinations of application services; however, in case of release updates of the services, in a worst case scenario, the complete role design had to be changed manually as well.

In comparison to the prior art, the added complexity allows to enhance the flexibility of the roles. It is an advantage of the present invention, that in the event of replacing the first assignment table (i.e. when introducing a new role design), existing assignment pointers to logical services (table 103) remain unchanged.

Also, if the assignment pointer to logical service is modified (table 103), the given role design (table 101) remains unaffected.

The present invention can also be described as control computer 300 to control the execution of application services Se on application systems Sy that are implemented by further computers 301-303 (coupled to the control computer) Control computer 300 determines 205 a first role that is assigned to a user upon receiving log-on identification 371, and generates start instruction 350 for further computers 301-303 for executing at least one application service Se, control computer 300 is characterized by executing the following:

determining 210 logical services LSe that are assigned to the first role;

determining 220 at least one pointer P(Sy/Se) to application services Se that-are assigned to the logical service, (pointer having at least portions for application system Sy and application service Se); and providing a copy 230 of the pointer as start instruction 350.

The present invention has been described in FIGS. 1-4 in terms of system, processors, method, and computer program product. The computer program as described above can be embodied on medium 305 (cf. FIG. 1), that means program 100 can be (a) embodied on a record medium (e.g., a hard disk coupled to processor 300), (b) stored in a computer memory (e.g., RAM, ROM, processor registers), embodied in a read-only memory (e.g., CD-ROM disk, EPROM, DVD, magnetic cassette, flash memory card) or in a read-write memory (e.g., CD-RW), or (d) carried on an electrical signal (e.g., transmitted via device 360 being a modem or any other transmission device).

The invention claimed is:

1. A computer-implemented method executed by a first processor, the first processor coupled to further processors that run application systems with a plurality of application services, the computer-implemented method comprising:

determining a first role that is assigned to a user upon receiving a log-on identification;

generating a start instruction for the further processors for executing at least one application service;

determining logical services that are assigned to the first role;

determining at least one pointer to the application services that is assigned to the logical services, the pointer having a first portion with an identification of the application system and a second portion with an identification of the application service; and providing a copy of the pointer as the start instruction to the user assigned to the first role.

2. The computer-implemented method of claim 1 further comprising the first processor generating a start instruction with a unique resource locator (URL).

3. The computer-implemented method of claim 1 further comprising the first processor displaying a graphical representation of the application services that are pointed to by the pointers.

4. The computer-implemented method of claim 3, further comprising the first processor receiving a pointer selection from the user.

5. The computer-implemented method of claim 1, wherein upon receiving the log-on identification, determining multiple roles that are assigned to the user, determining further logical services, and determining further pointers.

6. The computer-implemented method of claim 1, further comprising the first processor displaying a feedback from the application services.

7. The computer-implemented method of claim 1, wherein determining a first role, determining logical services, and determining at least one pointer include looking up in a first predefined assignment table, looking up in a second predefined assignment table, and looking up in a third predefined assignment table, respectively.

8. A control computer to control the execution of application services on application systems that are implemented by further computers coupled to the control computer, The control computer determining a first role that is assigned to a user upon receiving a log-on identification, and generating a start instruction for the further computers for executing at least one application service, the control computer including computer program code that, when executed by a processor, causes the control computer to:

determine logical services that are assigned to the first role;

determine at least one pointer to the application services that is assigned to a logical service, The pointer having a first portion with an identification of the application system and a second portion with an identification of the application service; and provide a copy of the pointer as the start instruction to the user assigned to the first role.

9. A method to trigger the execution of application services in a plurality of application systems that are implemented by a plurality of application processors, the plurality of application processors coupled to a control processor, the method comprising:

determining a first role that is assigned to a user upon receiving a log-on identification;

determining logical services that are assigned to the first role;

determining at least one pointer to the application services that is assigned to a logical service, the pointer having a first portion with an identification of the application system and a second portion with an identification of the application service; and generating a start instruction for the application processors with a copy of the pointer for executing at least one application service.

10. The method of claim 9, wherein generating the start instruction comprises generating a start instruction with a unique resource locator(URL).

11. The method of claim 9, wherein determining pointers comprises displaying a graphical representation of the application services that are pointed to by the pointers.

12. The method of claim 9, wherein determining pointers comprises receiving a pointer selection from the user.

13. The method of claim 9, further comprising determining multiple roles that are assigned to the user, determining further logical services and determining further pointers.

14. The method of claim 9, wherein determining a first role, determining logical services, and determining at least one pointer further include looking up in a first predefined assignment table, in a second predefined assignment table, and in a third predefined assignment table, respectively.

15. A method for launching a subset of application services out of a plurality of application services by a first computer system, the plurality of application services hosted by a plurality of further computer systems, the method being performed by the first computer system and comprising:

receiving a log-on identification from a user;

determining a first role of the user based on the log-on identification, wherein the first role is a representation of the subset of application services;

identifying a subset of logical services for the role out of a plurality of logical services;

finding a subset of application service pointers out of a plurality of application service pointers, wherein the application service pointers of the subset are assigned to the logical services of the subset of logical services; and launching the subset of application services identified by the subset of application service pointers.

* * * * *